US012126039B2

(12) United States Patent
Randolph

(10) Patent No.: US 12,126,039 B2
(45) Date of Patent: Oct. 22, 2024

(54) BATTERY PLACEMENT RACK

(71) Applicant: Curtis Randolph, Pacoima, CA (US)

(72) Inventor: Curtis Randolph, Pacoima, CA (US)

( * ) Notice: Subject to any disclaimer, the term of this patent is extended or adjusted under 35 U.S.C. 154(b) by 308 days.

(21) Appl. No.: 17/886,119

(22) Filed: Aug. 11, 2022

(65) Prior Publication Data

US 2024/0055713 A1 Feb. 15, 2024

(51) Int. Cl.
*H01M 50/244* (2021.01)
*B60K 1/04* (2019.01)
*H01M 50/249* (2021.01)

(52) U.S. Cl.
CPC ............ *H01M 50/244* (2021.01); *B60K 1/04* (2013.01); *H01M 50/249* (2021.01); *H01M 2220/20* (2013.01)

(58) Field of Classification Search
CPC ........... H01M 2220/20; H01M 50/204; H01M 50/244; H01M 50/249; B60K 1/04; B60K 2001/0438
See application file for complete search history.

(56) References Cited

U.S. PATENT DOCUMENTS

| | | | | |
|---|---|---|---|---|
| 3,983,952 | A | * | 10/1976 | McKee .................. B60L 50/64 180/68.5 |
| 5,734,238 | A | * | 3/1998 | Yanagisawa ............. B60K 1/04 701/1 |
| 5,921,578 | A | * | 7/1999 | Sekita ...................... B60K 1/04 296/203.02 |
| 9,085,302 | B2 | * | 7/2015 | Borroni-Bird .......... B60T 13/74 |
| 9,156,341 | B2 | * | 10/2015 | Matsumura ............. B60L 50/51 |
| 9,896,822 | B2 | * | 2/2018 | Kohno ............. H01M 10/6567 |
| 11,158,894 | B2 | * | 10/2021 | Favaretto ............ H01M 10/643 |
| 11,351,850 | B1 | * | 6/2022 | Calandruccio ........... B60K 1/00 |
| 11,518,206 | B2 | * | 12/2022 | Harmon ............... B62D 63/025 |
| 11,584,211 | B2 | * | 2/2023 | Hattori ................... B62D 21/09 |
| 2013/0078071 | A1 | * | 3/2013 | Noguchi .................. B60K 1/04 414/719 |
| 2018/0237076 | A1 | * | 8/2018 | Perlo ....................... B60K 1/02 |
| 2022/0396931 | A1 | * | 12/2022 | Kishida ................... B60L 53/80 |

FOREIGN PATENT DOCUMENTS

CN 108556916 A * 9/2018

* cited by examiner

*Primary Examiner* — Emma K Frick
(74) *Attorney, Agent, or Firm* — Curtis Randolph

(57) ABSTRACT

A mounting rack may include a multi-platform arrangement configured to secure multiple batteries, typically of the Group-31 type, in addition to providing a mounting rack for various hydraulic components in operable communication with the multiple batteries. The disclosed battery placement rack is configured to attach to a vehicle as well as configurable for multiple Group-31 or similar type batteries, including additional hydraulic components. The disclosed rack may be attached to the frame of a vehicle and may be expandable in a modular configuration to include additional batteries or hydraulic components.

20 Claims, 7 Drawing Sheets

BATTERY PLACEMENT RACK

TECHNICAL FIELD

The embodiments generally relate to mounting structures and racks configured for hydraulic systems within a vehicle.

BACKGROUND

In the low riding vehicle industry hydraulic systems have become prominent. The hydraulic system component choice and placement of these components offer a degree of challenge, technical expertise, and experience to achieve both function and performance requirements demanded by the industry.

Hydraulic system components may be integrated into automobiles using various types of racks, mounts, and holders. Often, installers must design, develop, and create one-off components for placement and mounting apparatus at the expense of cost and time. The need for standardization, placement, and configurability of mounting racks is apparent.

SUMMARY

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

In general, the embodiments described herein relate to mounting rack including a multi-platform arrangement configured to secure multiple batteries, typically of the Group-31 type, in addition to providing a mounting rack for various hydraulic components in operable communication with the multiple batteries.

The disclosed battery placement rack is removable from a vehicle as well as configurable for multiple Group-31 or similar type batteries, including additional hydraulic components. The disclosed rack may be attached to the frame of a vehicle and may be expandable in a modular configuration to include additional batteries or hydraulic components. The rack may include various brackets and systems for securing batteries and hydraulic components to the rack.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A complete understanding of the present embodiments and the advantages and features thereof will be more readily understood by reference to the following detailed description, appended claims, and accompanying drawings, wherein:

Figure 1:
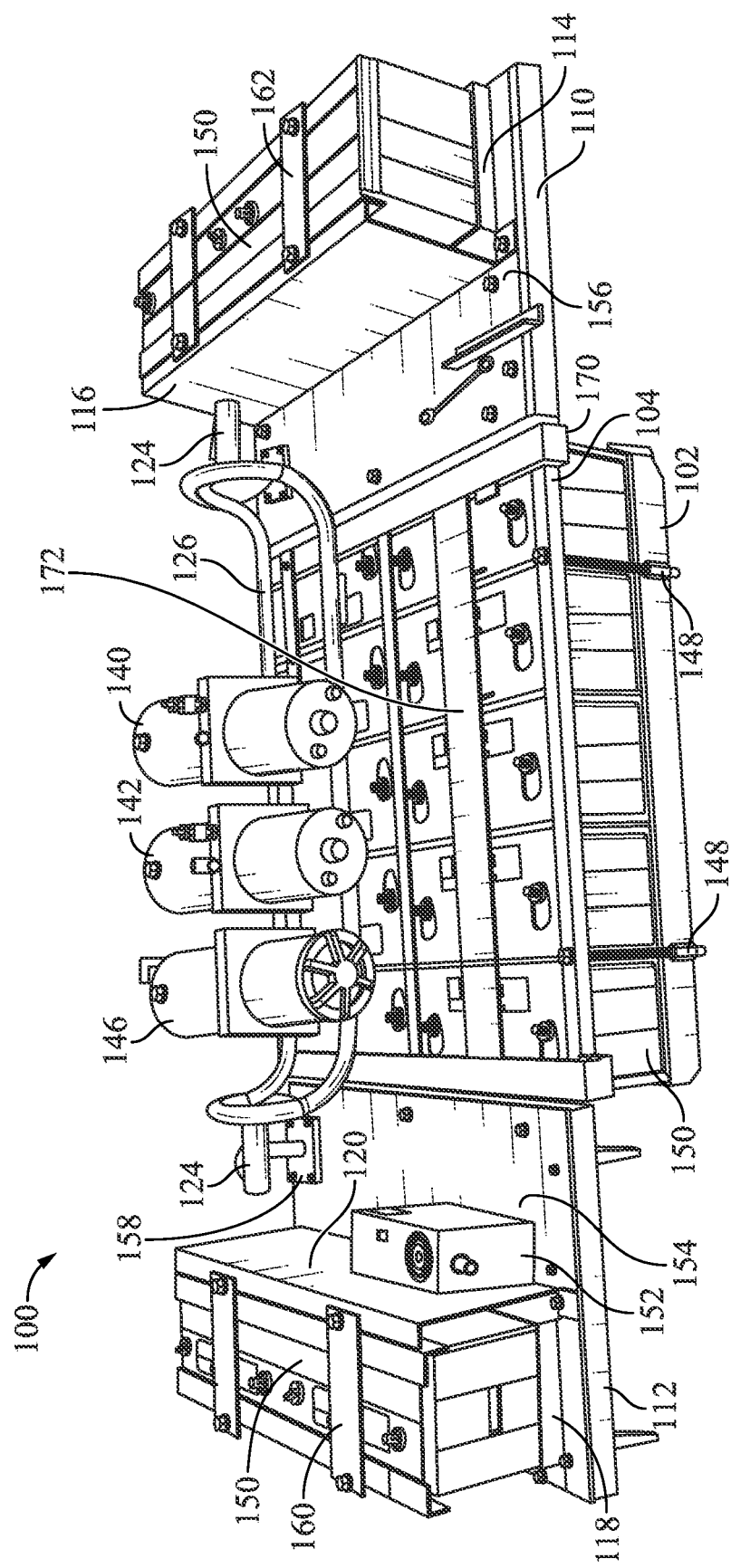
FIG. 1 illustrates a perspective view of the disclosed battery placement rack according to some embodiments described herein.

The drawings are not necessarily to scale, and certain features and certain views of the drawings may be shown exaggerated in scale or in schematic in the interest of clarity and conciseness.

DETAILED DESCRIPTION

The specific details of the single embodiment or variety of embodiments described herein are to the described system and methods of use. Any specific details of the embodiments are used for demonstration purposes only and no unnecessary limitations or inferences are to be understood from there.

It is noted that the embodiments reside primarily in combinations of components and procedures related to the system. Accordingly, the system components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

The disclosed battery placement rack is removable from a vehicle as well as configurable for multiple Group-31 or similar type batteries, including additional hydraulic components. The disclosed rack may be attached to the frame of a vehicle and may be expandable in a modular configuration to include additional batteries or hydraulic components. The rack may include various brackets and systems for securing batteries and hydraulic components to the rack.

Referring to FIG. 1, the disclosed rack 100 may include a first mounting rack including a lower rack 102 and an upper rack 104 which may be secured to one another via vertical attachment members 148 to secure a plurality of batteries 150 therein. The upper rack 104 may include sides braces 170 and cross braces 172. Side braces 170 may be constructed and arranged to mechanically connect to a first side rack 110 and a second side rack 112. Cross braces 172 may provide structural support to the first mounting rack, as well as providing structural support for the first side rack 110 and a second side rack 112.

The first side rack 110 may include a first plate 156 for securing fixtures there on. A first battery mounting base 114 may define a seat in which at least one battery 150 may be secured. At least one battery 150 may further be secured via a first battery bracket 116 and accompanying first bracket brace 162 which may be secured to the first battery mounting base 114.

The second side rack 112 may include a second plate 154 for securing fixtures there on. A second battery mounting base 118 may define a seat in which at least one battery 150 may be secured. At least one battery 150 may further be secured via a second battery bracket 120 and accompanying second bracket brace 160 which may be secured to the second battery mounting base 118. The second side rack 112 and first side rack 110, including the first plate 156 and second plate 154, may be constructed to secure additional components 152 thereon.

A hydraulic component mounting rack 126 may be mounting to at least one of the second side rack 112, first side rack 110, first plate 156, or second plate 154 via at least one mounting arm 124.

It will be recognized that the disclosed system is highly modular and various side racks, mounting racks, and other components can be secured to the first mounting rack in a wide variety of arrangements, all of which are contemplated by this disclosure.

Figure 2:
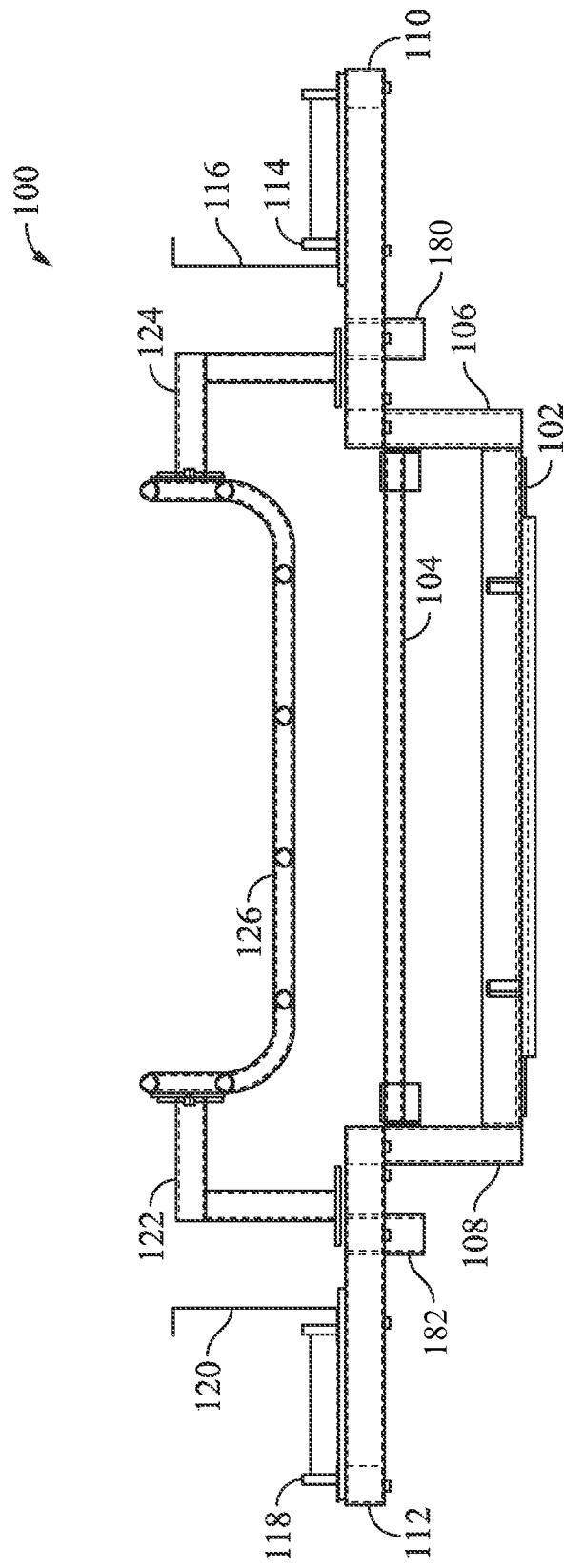
FIG. 2 illustrates a front view of the disclosed battery placement rack according to some embodiments described herein.

FIG. 2 illustrates a front view of the disclosed battery placement rack 100 including a lower rack 102 and an upper rack 104 which may be secured to one another via vertical attachment members 148 to secure a plurality of batteries 150 therein. Vertical support members 106 and 108 may join the lower rack 102 and an upper rack 104.

The first side rack 110 may include a first plate for securing fixtures there on. A first battery mounting base 114 may define a seat in which at least one battery may be secured. At least one battery may further be secured via a first battery bracket 116 which may be secured to the first battery mounting base 114. At least one first side rack support 180 may be disposed below the first plate 156 and attached to the first side rack 110 to provide structural support to the rack.

The second side rack 112 may include a second plate for securing fixtures there on. A second battery mounting base 118 may define a seat in which at least one battery may be secured. At least one battery may further be secured via a second battery bracket 120 which may be secured to the second battery mounting base 118. At least one second side rack support 182 may be disposed below the second plate 154 and attached to the second side rack 112 to provide structural support to the rack.

A hydraulic component mounting rack 126 may be mounting to at least one of the second side rack 112, first side rack 110, first plate, or second plate via a first mounting arm 122 and a second mounting arm 124.

Figure 3:
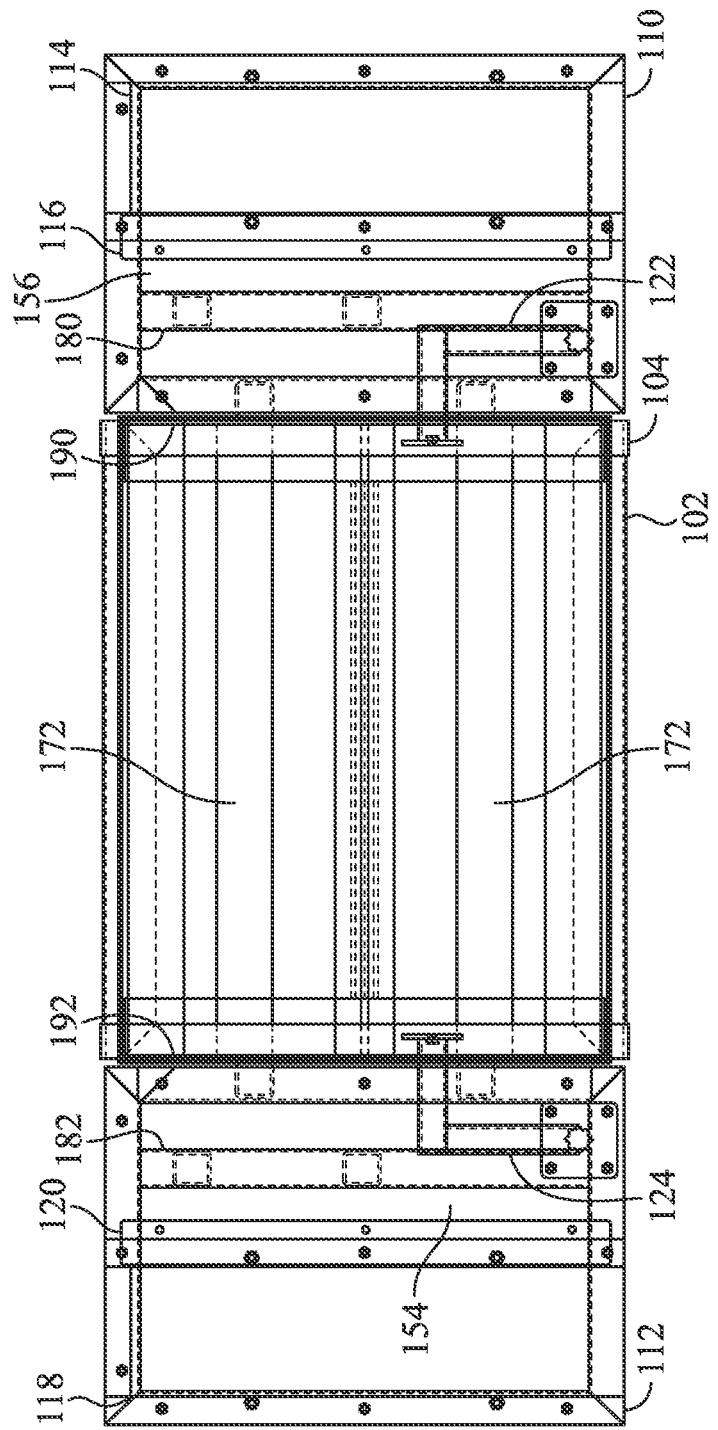
FIG. 3 illustrates a top view of the disclosed battery placement rack according to some embodiments described herein.

FIG. 3 illustrates a top view of the disclosed battery placement rack including a lower rack 102 and an upper rack 104 which may be secured to one another. The first side rack 110 may be attached to the upper rack 104 at joint 190 and may include a first plate 156 for securing fixtures there on. A first battery mounting base 114 may define a seat in which at least one battery may be secured. At least one battery may further be secured via a first battery bracket 116 which may be secured to the first battery mounting base 114. At least one first side rack support 180 may be disposed below the first plate 156 and attached to the first side rack 110 to provide structural support to the rack. Cross braces 172 may provide structural support to the first mounting rack, as well as providing structural support for the first side rack 110 and a second side rack 112.

The second side rack 112 may be attached to the upper rack 104 at joint 192 and may include a second plate 154 for securing fixtures there on. A second battery mounting base 118 may define a seat in which at least one battery may be secured. At least one battery may further be secured via a second battery bracket 120 which may be secured to the second battery mounting base 118. At least one second side rack support 182 may be disposed below the second plate 154 and attached to the second side rack 112 to provide structural support to the rack.

A hydraulic component mounting rack (not shown) may be mounting to at least one of the second side rack 112, first side rack 110, first plate, or second plate via a first mounting arm 122 and a second mounting arm 124 which may be secured to the first plate 156 and second plate 154, respectively.

Figure 4:
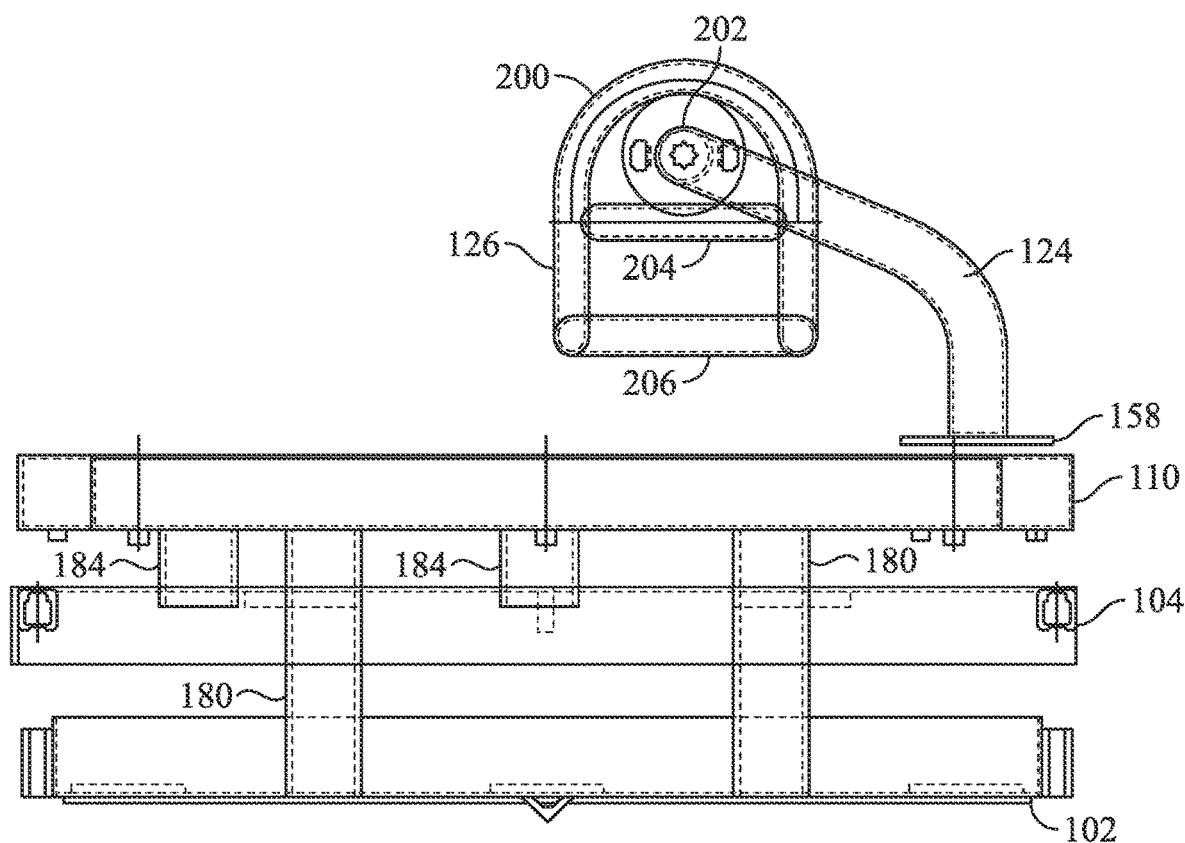
FIG. 4 illustrates a side view of the disclosed battery placement rack according to some embodiments described herein.

FIG. 4 illustrates a side view of the disclosed battery placement rack including a lower rack 102 and an upper rack 104 which may be secured to one another. According to one embodiment, at least one first side rack support 180 and at least one second side rack support 182 may secure a first side rack 110 or second side rack (not shown) to the lower rack 102, upper rack 104, or both while keeping the first side rack 110 or second side rack (not shown) spaced from the lower rack 102 and upper rack 104. Fixture 184 may be constructed and arranged to facilitate attachment of the battery placement rack to a vehicle frame view bolt, locking bolt, welded nut, or other suitable mechanical connection. Mounting arm 124 may be affixed to the first side rack 110 or second side rack (not shown) via a mounting flange 158 and may extend to support the hydraulic component mounting rack 126. The hydraulic component mounting rack 126 may be pivotably attached to the mounting arm 124 via rotational joint 202 which may allow the hydraulic component mounting rack 126 to rotate about a center axis of the rotational joint 202. The hydraulic component mounting rack 126 may include structural rods 206 to provide strength to the hydraulic component mounting rack 126 and at least one arc member 200.

Figure 5:
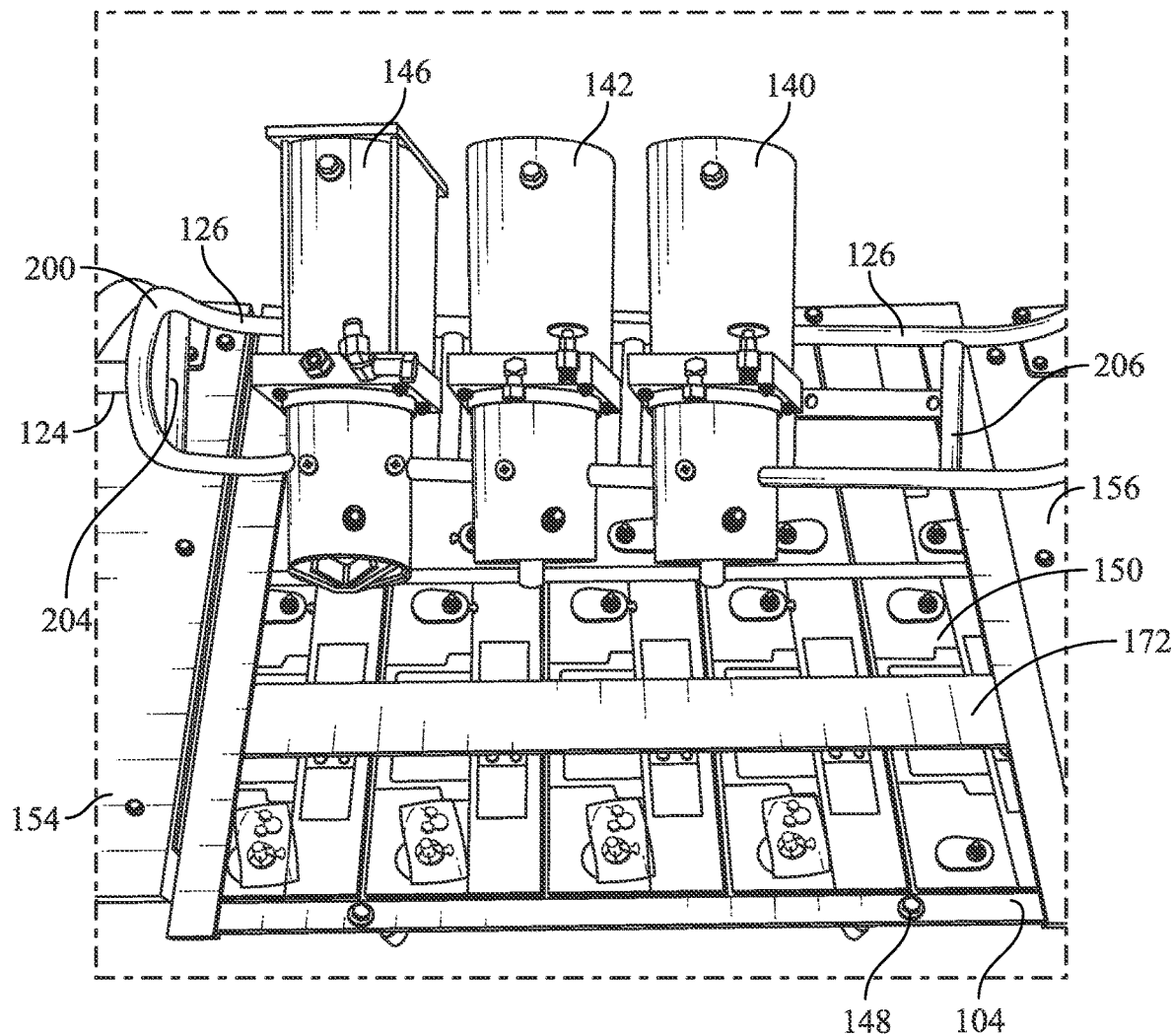
FIG. 5 illustrates a partial perspective view of a portion of the disclosed battery placement rack according to some embodiments described herein.

FIG. 5 illustrates a partial perspective view of a portion of the disclosed battery placement rack including a lower rack (not shown) and an upper rack 104 secured together via attachment members 148 to secure a plurality of batteries 150 therein. Cross members 172 may provide structural strength to the rack. Adjacent first side rack (not shown) may include a first plate 154 onto which the hydraulic component mounting rack 126 may be mounted via mounting arm 124. Adjacent to the upper rack 104 is also the second side rack (not shown) which may include a second plate 156 onto which the hydraulic component mounting rack 126 may be mounted via mounting arm 124. The hydraulic component mounting rack 126 may include structural rods 204, 206 to provide strength to the hydraulic component mounting rack 126 and at least one arc member 200. Hydraulic system components 140, 142, 146 may be mounted to the hydraulic component mounting rack 126 at the structural rods 204, 206 or other various means.

Figure 6:
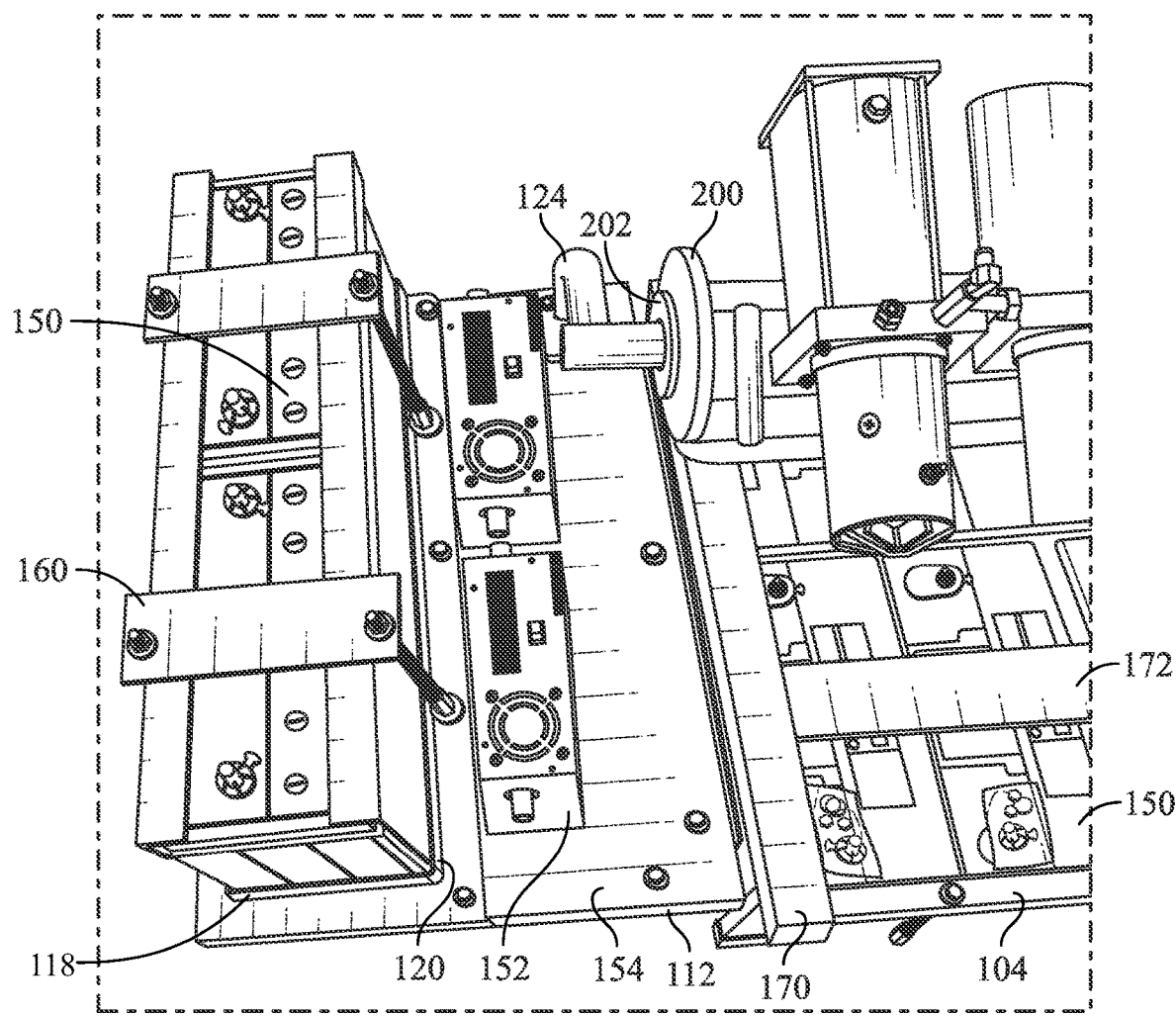
FIG. 6 illustrates a partial perspective view of a portion of the disclosed battery placement rack according to some embodiments described herein.

FIG. 6 illustrates a partial perspective view of a portion of the disclosed battery placement rack including a second side rack 112. For the purpose of illustration, the second side rack 112 is shown, but this description is equally applicable to that of the first side rack. The disclosed battery placement rack may include a lower rack (not shown) and an upper rack 104 secured together via attachment members 148 to secure a plurality of batteries 150 therein. Side braces 170 may be joined to the upper rack 104 and cross braces 172 to provide structural strength to the rack. The second side rack 112 may include a second plate 154 thereon. At least one battery 150 may further be secured via a second battery bracket 120 and accompanying second bracket brace 160 which may be secured to the second battery mounting base 118. At least one mounting arm 124 may be secured to the second plate 154 and may be pivotably attached the arc member 200 via the rotational joint 202 of the hydraulic components mounting rack.

Figure 7:
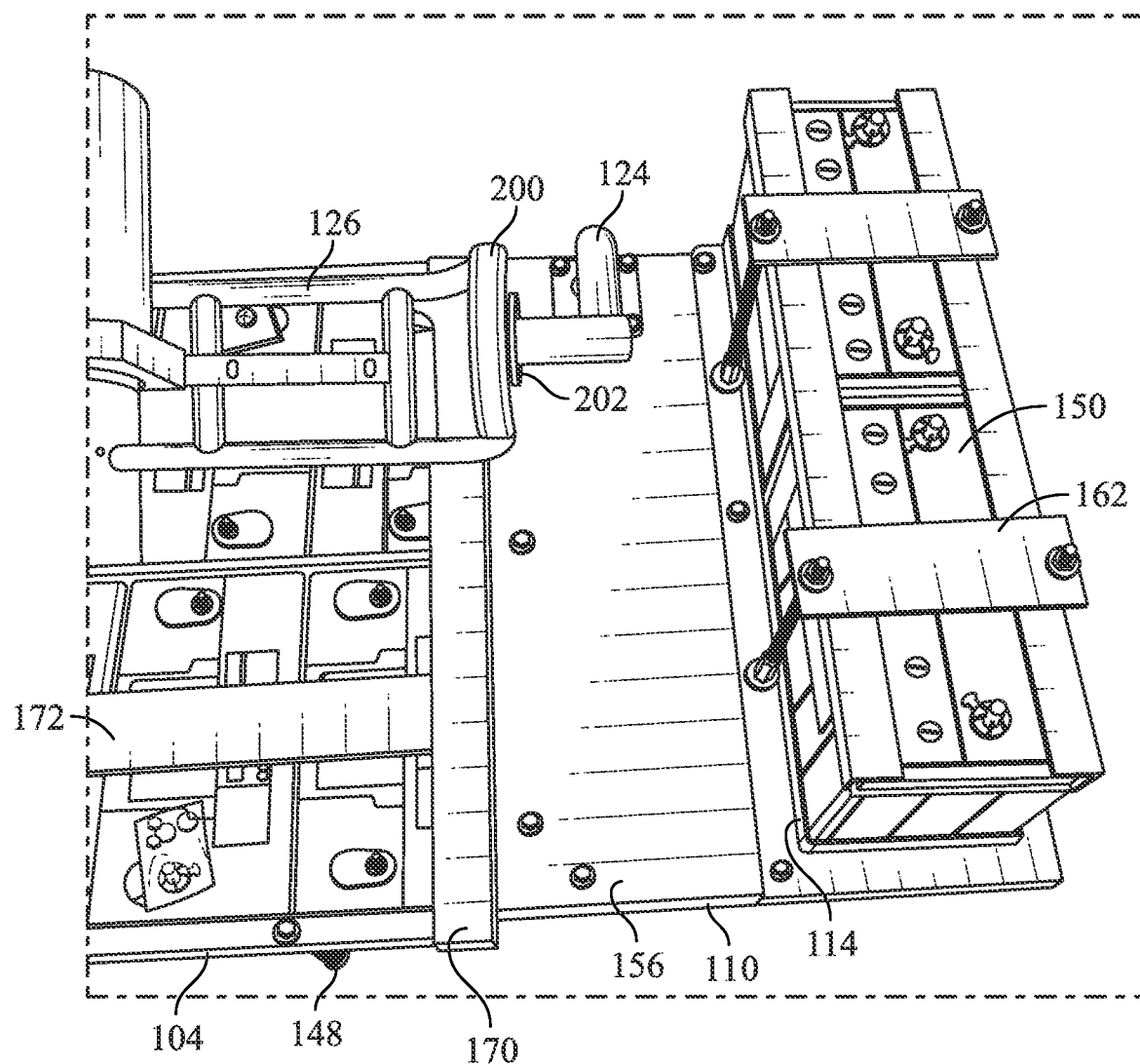
FIG. 7 illustrates a partial perspective view of a portion of the disclosed battery placement rack according to some embodiments described herein.

FIG. 7 illustrates a partial perspective view of a portion of the disclosed battery placement rack including a first side rack 110. For the purpose of illustration, the first side rack 110 is shown, but this description is equally applicable to that of the second side rack. The disclosed battery placement rack may include a lower rack (not shown) and an upper rack 104 secured together via attachment members 148 to secure a plurality of batteries 150 therein. Side braces 170 may be joined to the upper rack 104 and cross braces 172 to provide structural strength to the rack. The first side rack 110 may include a first plate 156 thereon. At least one battery 150 may further be secured withing the first battery mounting base 114 via the first bracket brace 160. At least one mounting arm 124 may be secured to the first plate 156 and may be pivotably attached the arc member 200 via the rotational joint 202 of the hydraulic components mounting rack 126.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and are still considered to be within the scope of the invention.

According to variation 1, a rack may include a first mounting rack including a lower rack and secured to an upper rack via a plurality of vertical attachment members to secure at least one first battery; at least one first side rack including a first plate mounted thereon; a first battery mounting base defining a seat in which at least one battery can be secured; at least one first battery bracket and at least one bracket brace constructed and arranged to secure at least one second battery within the seat defined by the first battery mounting base; at least one hydraulic component mounting rack; and a first mounting arm joining the at least one hydraulic component mounting rack to the first plate.

Variation 2 may include a rack as in variation 1 wherein the first battery mounting base is attached to the first plate.

Variation 3 may include a rack as in any of variations 1 through 2 wherein the at least one first battery bracket and at least one bracket brace are attached to the first battery mounting base.

Variation 4 may include a rack as in any of variations 1 through 3 wherein the at least one hydraulic component mounting rack includes at least one rotational joint attaching the at least one hydraulic component mounting rack to the first mounting arm.

Variation 5 may include a rack as in any of variations 1 through 4 wherein the at least one hydraulic component mounting rack includes a plurality of structural rods constructed and arranged to provide strength to the hydraulic component mounting rack.

Variation 6 may include a rack as in any of variations 1 through 5 wherein the at least one hydraulic component mounting rack includes at least one arc member constructed and arranged to provide strength to the hydraulic component mounting.

Variation 7 may include a rack as in any of variations 1 through 6 further including a second side rack including a second plate for securing fixtures thereon.

Variation 8 may include a rack as in any of variations 1 through 7 further including a second battery mounting base defining a seat in which at least one battery can be secured.

Variation 9 may include a rack as in any of variations 1 through 8 further including at least one second battery bracket and at least one second bracket brace attached to the second battery mounting base.

Variation 10 may include a rack as in any of variations 1 through 9 further including at least one cross brace constructed and arranged to provide structural support to the first mounting rack.

Variation 11 may include a rack as in any of variations 1 through 10 further including at least one side brace constructed and arranged to provide structural support to the first mounting rack.

Variation 12 may include a rack as in any of variations 1 through 11 further including at least one group 31 battery.

According to variation 13, a rack may include a first mounting rack including a lower rack and secured to an upper rack via a plurality of vertical attachment members to secure at least one first battery; a first side rack including a first plate mounted thereon; a first battery mounting base defining a first seat in which at least one battery can be secured, the first battery mounting base being secured to the first plate; at least one first battery bracket and at least one first bracket brace constructed and arranged to secure at least one second battery within the seat defined by the first battery mounting base; a second side rack including a second plate mounted thereon; a second battery mounting base defining a second seat in which at least one battery can be secured, the second battery mounting base being secured to the second plate; at least one second battery bracket and at least one second bracket brace constructed and arranged to secure at least one second battery within the second seat defined by the second battery mounting base; at least one hydraulic component mounting rack; a first mounting arm joining the at least one hydraulic component mounting rack to the first plate; and a second mounting arm joining the at least one hydraulic component mounting rack to the second plate.

Variation 14 may include a rack as in variation 13 wherein the at least one hydraulic component mounting rack includes a first rotational joint attaching the at least one hydraulic component mounting rack to the first mounting arm.

Variation 15 may include a rack as in any of variations 13 through 14 wherein the at least one hydraulic component mounting rack includes a second rotational joint attaching the at least one hydraulic component mounting rack to the second mounting arm.

Variation 16 may include a rack as in any of variations 13 through 15 wherein the at least one hydraulic component mounting rack includes a plurality of structural rods constructed and arranged to provide strength to the hydraulic component mounting rack.

Variation 17 may include a rack as in any of variations 13 through 16 wherein the at least one hydraulic component mounting rack includes a first arc member and a second arc member both being constructed and arranged to provide strength to the hydraulic component mounting.

Variation 18 may include a rack as in any of variations 13 through 17 wherein the first arc member is attached to the first rotational joint.

Variation 19 may include a rack as in any of variations 13 through 18 wherein the second arc member is attached to the second rotational joint.

According to variation 20, a rack may include a first mounting rack including a lower rack and secured to an upper rack via a plurality of vertical attachment members to secure at least one first battery; a first side rack including a first plate mounted thereon; a first battery mounting base defining a first seat in which at least one battery can be secured, the first battery mounting base being secured to the first plate; at least one first battery bracket and at least one first bracket brace constructed and arranged to secure at least one second battery within the seat defined by the first battery mounting base; a second side rack including a second plate mounted thereon; a second battery mounting base defining a second seat in which at least one battery can be secured, the second battery mounting base being secured to the second plate; at least one second battery bracket and at least one second bracket brace constructed and arranged to secure at least one second battery within the second seat defined by the second battery mounting base; at least one hydraulic component mounting rack including a first arc member attached to a first rotational joint and further including a second arc member attached to a second rotational joint; a first mounting arm joining the at least one hydraulic component mounting rack to the first plate and in operable connection with the first rotational joint; and a second mounting arm joining the at least one hydraulic component mounting rack to the second plate and in operable connection with the second rotational joint.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for anyone of the elements in the claims below or that a single element can be substituted for two or more elements in a claim. Although elements can be described above as acting in certain combinations, and even initially claimed as such, it is to be expressly understood that one or more elements from a claimed combination can, in some cases, be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible considering the above teachings without departing from the following claims.

I claim:

1. A rack comprising:
a first mounting rack comprising a lower rack and secured to an upper rack via a plurality of vertical attachment members to partially house at least one first battery;
at least one first side rack comprising a first plate mounted thereon;
a first battery mounting base defining a seat;
at least one first battery bracket and at least one bracket brace constructed and arranged to partially house at least one second battery within the seat defined by the first battery mounting base;
at least one hydraulic component mounting rack; and
a first mounting arm joining the at least one hydraulic component mounting rack to the first plate.

2. The rack as in claim 1, wherein the first battery mounting base is attached to the first plate.

3. The rack as in claim 1, wherein the at least one first battery bracket and at least one bracket brace are attached to the first battery mounting base.

4. The rack as in claim 1, wherein the at least one hydraulic component mounting rack comprises at least one rotational joint attaching the at least one hydraulic component mounting rack to the first mounting arm.

5. The rack as in claim 1, wherein the at least one hydraulic component mounting rack comprises a plurality of structural rods constructed and arranged to provide strength to the hydraulic component mounting rack.

6. The rack as in claim 1, wherein the at least one hydraulic component mounting rack comprises at least one arc member constructed and arranged to provide strength to the hydraulic component mounting rack.

7. The rack as in claim 1, further comprising a second side rack comprising a second plate.

8. The rack as in claim 7 further comprising a second battery mounting base defining a seat.

9. The rack as in claim 8, further comprising at least one second battery bracket and at least one second bracket brace attached to the second battery mounting base.

10. The rack as in claim 1, further comprising at least one cross brace constructed and arranged to provide structural support to the first mounting rack.

11. The rack as in claim 1, further comprising at least one side brace constructed and arranged to provide structural support to the first mounting rack.

12. The rack as in claim 1, further comprising at least one group 31 battery.

13. A rack comprising:
a first mounting rack comprising a lower rack and secured to an upper rack via a plurality of vertical attachment members to partially house at least one first battery;
a first side rack comprising a first plate mounted thereon;
a first battery mounting base defining a first seat, the first battery mounting base being attached to the first plate;
at least one first battery bracket and at least one first bracket brace constructed and arranged to partially house at least one second battery within the first seat defined by the first battery mounting base;
a second side rack comprising a second plate mounted thereon;
a second battery mounting base defining a second seat, the second battery mounting base being attached to the second plate;
at least one second battery bracket and at least one second bracket brace constructed and arranged to partially house at least one second battery within the second seat defined by the second battery mounting base;
at least one hydraulic component mounting rack;
a first mounting arm joining the at least one hydraulic component mounting rack to the first plate; and
a second mounting arm joining the at least one hydraulic component mounting rack to the second plate.

14. The rack as in claim 13, wherein the at least one hydraulic component mounting rack comprises a first rotational joint attaching the at least one hydraulic component mounting rack to the first mounting arm.

15. The rack as in claim 14, wherein the at least one hydraulic component mounting rack comprises a second rotational joint attaching the at least one hydraulic component mounting rack to the second mounting arm.

16. The rack as in claim 15, wherein the at least one hydraulic component mounting rack comprises a plurality of structural rods constructed and arranged to provide strength to the hydraulic component mounting rack.

17. The rack as in claim 16, wherein the at least one hydraulic component mounting rack comprises a first arc member and a second arc member both being constructed and arranged to provide strength to the hydraulic component mounting rack.

18. The rack as in claim 17, wherein the first arc member is attached to the first rotational joint.

19. The rack as in claim 18, wherein the second arc member is attached to the second rotational joint.

20. A rack comprising:
- a first mounting rack comprising a lower rack and attached to an upper rack via a plurality of vertical attachment members to partially house at least one first battery;
- a first side rack comprising a first plate mounted thereon;
- a first battery mounting base defining a first seat, the first battery mounting base being attached to the first plate;
- at least one first battery bracket and at least one first bracket brace constructed and arranged to partially house at least one second battery within the seat defined by the first battery mounting base;
- a second side rack comprising a second plate mounted thereon;
- a second battery mounting base defining a second seat, the second battery mounting base being attached to the second plate;
- at least one second battery bracket and at least one second bracket brace constructed and arranged to partially house at least one second battery within the second seat defined by the second battery mounting base;
- at least one hydraulic component mounting rack comprising a first arc member attached to a first rotational joint and further comprising a second arc member attached to a second rotational joint;
- a first mounting arm joining the at least one hydraulic component mounting rack to the first plate and in operable connection with the first rotational joint; and
- a second mounting arm joining the at least one hydraulic component mounting rack to the second plate and in operable connection with the second rotational joint.

* * * * *